United States Patent
Moribe

(10) Patent No.: US 8,988,734 B2
(45) Date of Patent: Mar. 24, 2015

(54) IMAGE PROCESSING APPARATUS AND CONTROL METHOD CONFIGURED TO COMPLEMENT A RECORDING AMOUNT ASSIGNED TO DEFECTIVE NOZZLES

(71) Applicant: Canon Kabushiki Kaisha, Tokyo (JP)

(72) Inventor: Shoei Moribe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/862,103

(22) Filed: Apr. 12, 2013

(65) Prior Publication Data

US 2013/0271793 A1    Oct. 17, 2013

(30) Foreign Application Priority Data

Apr. 16, 2012  (JP) .................................. 2012-093114

(51) Int. Cl.
| H04N 1/405 | (2006.01) |
| --- | --- |
| B41J 2/205 | (2006.01) |
| B41J 2/21 | (2006.01) |
| G06K 15/10 | (2006.01) |
| H04N 1/52 | (2006.01) |
| H04N 1/60 | (2006.01) |

(52) U.S. Cl.
CPC ............. *B41J 2/205* (2013.01); *B41J 2/2139* (2013.01); *G06K 15/107* (2013.01); *H04N 1/40018* (2013.01); *H04N 1/52* (2013.01); *H04N 1/6041* (2013.01)
USPC ............ 358/3.06; 358/1.9; 358/1.8; 358/504; 347/14; 347/19

(58) Field of Classification Search
None
See application file for complete search history.

(56) References Cited

U.S. PATENT DOCUMENTS

| 5,992,962 | A  | * | 11/1999 | Yen et al. ...................... 347/9 |
| --- | --- | --- | --- | --- |
| 6,089,695 | A  | * | 7/2000 | Takagi et al. ................ 347/40 |
| 7,347,523 | B2 | * | 3/2008 | Tatsumi ....................... 347/19 |
| 8,262,191 | B2 | * | 9/2012 | Mori ........................... 347/19 |
| 8,496,313 | B2 | * | 7/2013 | Ueshima ....................... 347/14 |
| 8,511,788 | B2 | * | 8/2013 | Inoue ........................... 347/19 |
| 8,740,339 | B2 | * | 6/2014 | Yamazaki ..................... 347/19 |
| 2004/0104951 | A1 | * | 6/2004 | Shibata et al. ................ 347/14 |
| 2005/0116981 | A1 | * | 6/2005 | Faken et al. .................. 347/19 |
| 2006/0082848 | A1 | * | 4/2006 | Takakura et al. ............ 358/534 |
| 2006/0181565 | A1 | * | 8/2006 | Arazaki ....................... 347/19 |
| 2006/0284916 | A1 | * | 12/2006 | Heiles et al. ................. 347/19 |
| 2007/0024662 | A1 | * | 2/2007 | Arazaki ....................... 347/19 |

FOREIGN PATENT DOCUMENTS

JP    2000-94662 A    4/2000

* cited by examiner

*Primary Examiner* — Dung Tran
(74) *Attorney, Agent, or Firm* — Canon USA Inc IP Division

(57) ABSTRACT

An image processing apparatus for forming an image by performing a plurality of times of recording on a same region of a recording medium by using a recording head including a plurality of recording elements for each of a first color material and a second color material, and a generation unit configured to generate recording data corresponding to each scan of the first color material and the second color material, wherein the generation unit generates, in a case where a defective recording element occurs among the plurality of recording elements for recording the first color material, recording data corresponding to each scan of the first color material by complementing a recording amount assigned to the defective recording element so that impact order between the first color material and the second color material is not changed.

14 Claims, 17 Drawing Sheets

FIG.7

|          | C       | M       | Y       | K       |
|----------|---------|---------|---------|---------|
| C_1 PASS | C1 → C2 | —       | —       | —       |
| C_2 PASS | C2 → C3 | —       | —       | —       |
| C_3 PASS | C3 → C1 | —       | —       | —       |
| C_4 PASS | —       | —       | —       | —       |
| M_1 PASS | —       | M1 → M2 | —       | —       |
| M_2 PASS | —       | M2 → M3 | —       | —       |
| ....     | ....    | ....    | ....    | ....    |
| K_1 PASS | —       | —       | —       | —       |
| K_2 PASS | —       | —       | —       | K3 → K1 |
| K_3 PASS | C1 → C1 | M2 → M1 | Y2 → Y1 | K3 → K2 |
| K_4 PASS | C3 → C2 | M3 → M2 | Y3 → Y2 | K4 → K3 |

FIG.14

| | C | M | Y | K |
|---|---|---|---|---|
| C_1 PASS | C1 → C2(0.5), C3(0.5) | — | — | — |
| C_2 PASS | C2 → C3(0.5), C4(0.5) | — | — | — |
| C_3 PASS | C3 → C4(1.0) | — | — | — |
| C_4 PASS | C4 → C3(1.0) | — | — | — |
| Y_1 PASS | C2 → C3(0.5), C4(0.5) | — | Y3 → Y1(0.5), Y2(0.5) | — |
| Y_2 PASS | — | — | Y1 → Y2(1.0) | — |
| Y_3 PASS | — | — | Y2 → Y1(1.0) | — |
| Y_4 PASS | — | — | Y3 → Y1(0.5), Y2(0.5) | — |
| M_1 PASS | — | M1 → M2(0.5), M3(0.5) | Y4 → Y2(0.5), Y3(0.5) | — |
| ... | ... | ... | ... | ... |

| 1 | 136 | 34 | 170 |
|---|---|---|---|
| 204 | 68 | 238 | 102 |
| 51 | 187 | 17 | 153 |
| 255 | 119 | 221 | 85 |

~2001

IMAGE PROCESSING APPARATUS AND CONTROL METHOD CONFIGURED TO COMPLEMENT A RECORDING AMOUNT ASSIGNED TO DEFECTIVE NOZZLES

BACKGROUND

1. Technical Field

Aspects of the present invention generally relate to an image processing apparatus to perform recording by using a plurality of color materials and a control method for the image processing apparatus.

2. Description of the Related Art

In recording by an inkjet recording apparatus, color development and gloss varies according to the order of impacts of color materials. Therefore, it is known that color unevenness and/or gloss unevenness occur when the order of impacts of the color materials varies for each image region. Specifically, in a case where pigment inks are used as the color materials, the influence on a recording medium becomes remarkable depending on the order of impacts of the color materials.

Generally, a recording head of the inkjet recording apparatus is equipped with a plurality of recording elements (i.e., nozzles) for each color material. However, malfunction may sometimes occur in some of the recording elements. An example of the malfunction includes defective discharge of the color material. When the defective discharge of the color material occurs, the color material is not discharged to a position to be originally recorded on the recording medium, resulting in occurrence of a visually unpleasant stripe unevenness in an image formed on the recording medium.

Therefore, in a multipass recording method, such a technique that the defectively discharging nozzle due to the malfunction (hereinbelow referred to as "defective nozzle") is complemented by the other normal nozzles is discussed in, for example, Japanese Patent Application Laid-Open No. 2000-94662. According to the method discussed in Japanese Patent Application Laid-Open No. 2000-94662, even when a defective nozzle arises, the color material still can be discharged to the position on the recording medium to be originally recorded.

However, in the method discussed in Japanese Patent Application Laid-Open Publication No. 2000-94662, since a print pattern is changed for each scan, the order of impacts of the color materials in a main scanning line corresponding to the position to be originally recorded by the defective nozzle may be changed with the other main scanning line. As a result, the color unevenness and/or the gloss unevenness may occur on the image to be formed.

SUMMARY

The present invention is directed to an image processing apparatus capable of complementing recording by a defective nozzle in consideration of the order of impacts of inks, and a control method for the image processing apparatus.

According to an aspect of the present invention, an image processing apparatus for forming an image by performing a plurality of times of recording on a same region of a recording medium by using a recording head including a plurality of recording elements for each of a first color material and a second color material different from the first color material includes an input unit configured to input image data of each of the first color material and the second color material, and a generation unit configured to generate recording data corresponding to each scan of the first color material and the second color material based on the image data of the first color material and the second color material, wherein the generation unit generates, in a case where a defective recording element occurs among the plurality of recording elements for recording the first color material, recording data corresponding to each scan of the first color material by complementing a recording amount assigned to the defective recording element with a recording element corresponding to the first color material different from the defective recording element, and recording data corresponding to each scan of the second color material so that impact order between the first color material and the second color material is not changed, according to the defective recording element.

Further features and aspects of the present invention will become apparent from the following detailed description of exemplary embodiments with reference to the attached drawing

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a non-discharge complement setting table.

FIG. 14 is a non-discharge complement setting table.

FIG. 17 is a threshold matrix.

DESCRIPTION OF THE EMBODIMENTS

Various exemplary embodiments, features, and aspects of the invention will be described in detail below with reference to the drawings.

Configurations described below with reference to exemplary embodiments are mere examples and thus the present invention is not limited to those configurations.

Figure 1:
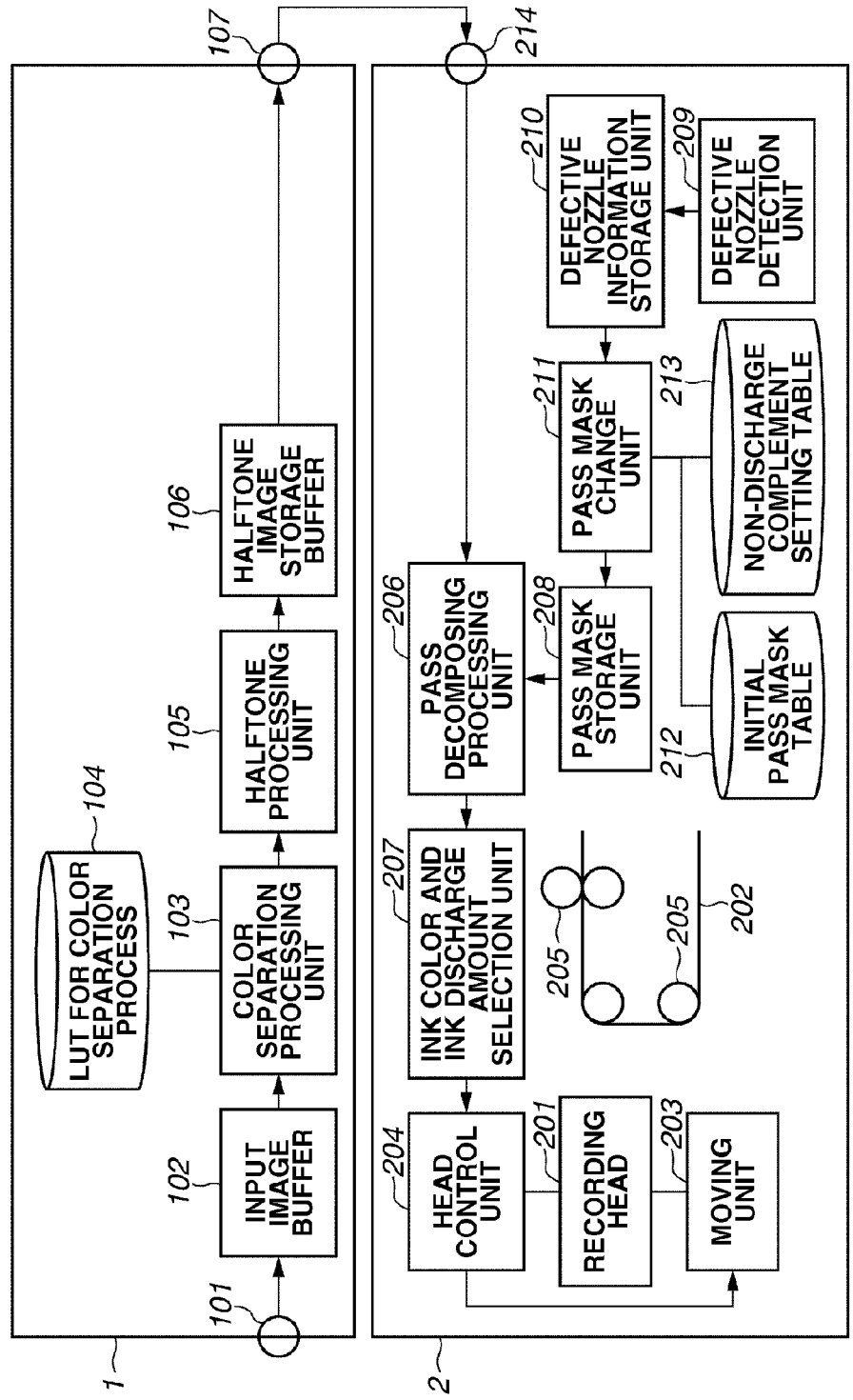
FIG. 1 is a block diagram illustrating a configuration of an image processing apparatus and an image forming apparatus.

FIG. 1 is a block diagram illustrating configurations of an image processing apparatus and an image forming apparatus applicable to a present exemplary embodiment. In FIG. 1, an image processing apparatus 1 and an image forming apparatus 2 are connected to each other via an interface or a circuit.

The image processing apparatus 1 is an installed printer driver, for example, in a general personal computer. In this case, below-described each unit of the image processing apparatus 1 is realized by the computer executing a predetermined program. As another configuration, the image forming apparatus 2 may include the image processing apparatus 1.

The image processing apparatus 1 inputs color image data to be recorded (hereinafter referred to as "color input image data") via an input terminal 101 to store the color input image data in an input image buffer 102. The color input image data is constituted of three color components of red (R), green (G), and blue (B).

Figure 4:
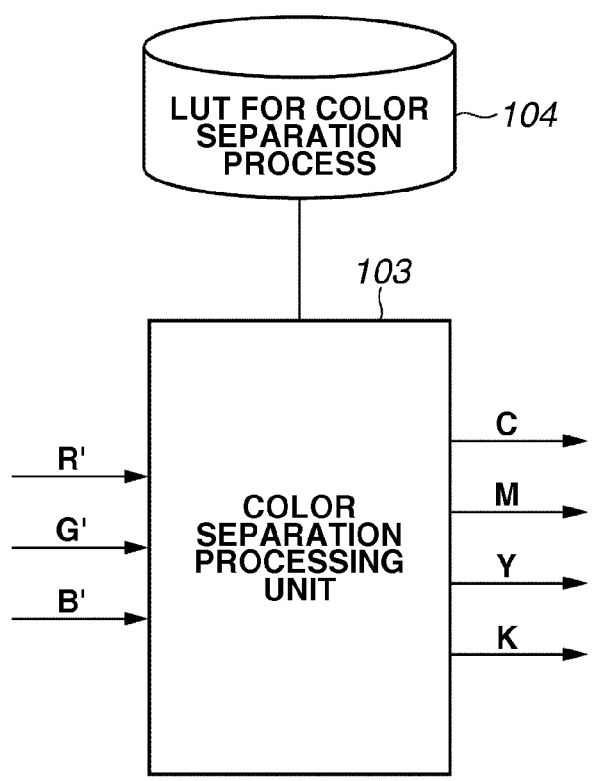
FIG. 4 is a diagram illustrating a color separation processing unit.

A color separation processing unit 103 separates colors of the stored input image data into colors of color materials held by the image forming apparatus 2. In the color separation processing, as illustrated in FIG. 4, a look up table (LUT) for color separation 104 is referred to. In the present exemplary embodiment, a black (K) color alone is exemplified for the description. In a case where a color image is formed on the recording medium, the color image may be separated into a plurality of colors such as cyan (C), magenta (M), yellow (Y), and black (K). In the present exemplary embodiment, color separated data is treated as 8-bit data representing 256 step gradation ranging from 0 to 255. However, the data may be converted into data having more than the above described gradation steps.

A halftone processing unit 105 performs halftone processing on the color separated data of each color obtained by a color separation processing unit 103. Here, 8-bit color separated data is converted into 1-bit (i.e., binary) data. The halftone processing unit 105 outputs halftone image data to a halftone image storage buffer 106. The stored halftone image data is output to the image forming apparatus 2 via an output terminal 107.

A pass separation processing unit 206 decomposes halftone image data of each color generated by the image processing apparatus 1 into each scan to generate recording data corresponding to the each scan. A pass mask obtained from a pass mask storage unit 208 is used in the pass separation. The ink color selection unit 207 selects a color of a color material among colors of color materials installed in a recording head 201 based on the recording data.

A defective nozzle detection unit 209 detects a nozzle in a defective discharge state among a plurality of nozzles constituting the recording head 201. Information of the detected defective nozzle is stored in a defective nozzle information storage unit 210. A method for obtaining the defective nozzle information is not limited to the defective discharge nozzle detection unit 209. For example, such a method is also employable that a defective discharge detecting image is formed and a user is encouraged to confirm the defective discharge detecting image and to set the defective nozzle information.

A pass mask change unit 211 obtains the defective nozzle information stored in the defective nozzle information storage unit 210. The defective nozzle information indicates which nozzle is in the defective discharge state. The pass mask change unit 211 changes a pass mask based on the defective nozzle information, an initial pass mask table 212, and a non-discharge complement setting table 213. Thus changed pass mask is stored in a pass mask storage unit 208.

Figure 2:
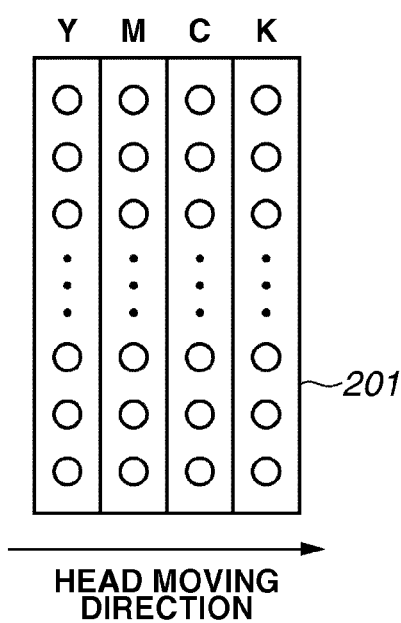
FIG. 2 is a diagram illustrating a configuration of a recording head.

The image forming apparatus 2 forms an image of halftone image data on a recording medium, halftone which is generated in the image processing apparatus 1 by moving the recording head 201 in a horizontal direction relative to the recording medium 202. In the present exemplary embodiment, an inkjet type recording head is used as the recording head 201. FIG. 2 illustrates the recording head of the present exemplary embodiment. The recording head 201 includes a plurality of recording elements (i.e., a plurality of nozzles) corresponding to the respective colors. In the present exemplary embodiment, inks of four colors such as cyan (C), magenta (M), yellow (Y), and black (K) are installed in the recording head 201. In FIG. 2, for the sake of simple description, such a configuration that a plurality of nozzles are arranged in line in a sheet conveyance direction is illustrated. However, the number of nozzles and the arrangement thereof are not limited to this example. For example, a configuration that a nozzle array includes nozzles each discharging a different ink discharge amount even in a case of the same color, a configuration that a plurality of arrays includes nozzles each discharging the same ink discharge amount, and a configuration that a plurality of nozzles are arranged in a zig-zag manner are employable. FIG. 2 illustrates a configuration that inks of different colors are arranged in line in a head traveling direction. However, the inks of different colors may be arranged in line in a sheet conveyance direction.

An ink color and ink discharge amount selection unit 207 selects an ink color and an ink discharge amount suitable for the recording data to form an image. In forming an image, the recording head 201 records the image on the recording medium by driving each nozzle at regular drive intervals while traveling relative to the recording medium 202.

A moving unit 203 moves on the recording head 201 under the control of a head control unit 204. A conveyance unit 205 conveys the recording medium under the control of the head control unit 204. In the present exemplary embodiment, a multipass recording method in which a plurality of times of recording is performed with respect to the same region of the recording medium for one color of color material to form an image is used.

Figure 3:
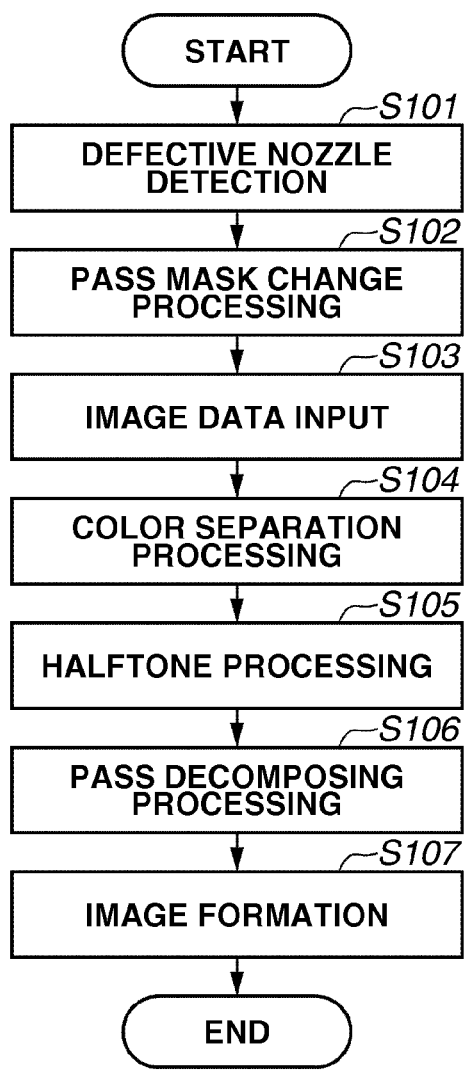
FIG. 3 is a flow chart illustrating a flow of an image processing method.

FIG. 3 is a flow chart illustrating a flow of image processing performed in the image processing apparatus 1 and the image forming apparatus 2 according to the present exemplary embodiment. The image processing performed according to the present exemplary embodiment is described below.

In step S101, a defective nozzle detection unit 209 detects a nozzle in a defective discharge state among a plurality of nozzles constituting the recording head 201. When a defective nozzle is detected, defective nozzle information indicating which nozzle is in the defective discharge state is stored in the defective nozzle information storage unit 210.

In step S102, a pass mask change unit 211 receives the defective nozzle information stored in the defective nozzle information storage unit 210 to change a pass mask according to the defective nozzle. Subsequently, the pass mask to be used is generated based on the defective nozzle information, the initial pass mask table 212, and the non-discharge complement setting table 213. Thus generated pass mask is stored in the pass mask storage unit 208. The pass mask change processing is described below in detail.

In step S103, color input image data is input via the input terminal 101 and stored in the input image buffer 102. In the input image data, color image data is constituted by three color components of red (R), green (G), and blue (B).

In step S104, the color separation processing unit 103 performs color separation processing on the multi-gradational color input image data stored in the input image buffer 102 to convert colors of the color materials from RGB to CMYK by using the LUT for color separation 104. In the present exemplary embodiment, the color separation processed data is treated as having the gradation steps ranging from 0 to 255. However, the color separation processed data may be converted into a gradation steps larger than the above described gradation steps.

As described above, the recording head 201 in the present exemplary embodiment has four colors of ink (i.e., color materials). Therefore, the color input image data of RGB is converted into image data corresponding to CMYK colors. In other words, four colors of image data corresponding to four colors of color materials are generated. A publicly known method in which conversion is performed by using an LUT is used as the color separation processing.

Returning to FIG. 3, in step S105, the halftone processing unit 105 converts the color separated data into halftone image data by halftone processing. In the halftone processing performed in the present exemplary embodiment, multi-valued color separated data is converted into binary data by using a publicly known error diffusion method. The halftone processing performed in the present exemplary embodiment is not limited to the error diffusion method, and quantization by using a dither matrix may be used. The halftone image data is stored in the halftone image storage buffer 106.

The halftone image data is output via the output terminal 107 in a whole size of the image or in a predetermined size such as a bandwidth per unit recording area.

In step S106, the pass separation processing unit 206 receives halftone image data via the input terminal 214 and performs pass separation processing. The halftone image data is converted into recording data corresponding to each scan by the pass separation processing.

Figure 6:
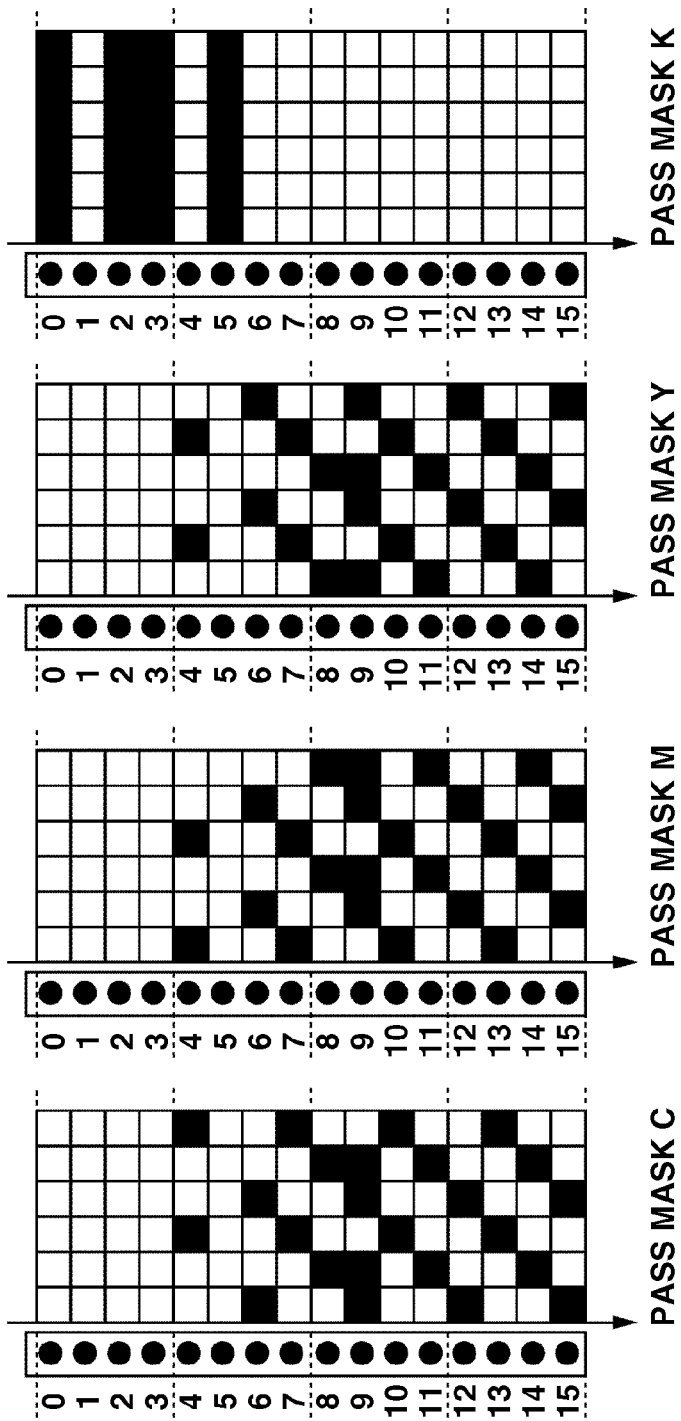
FIG. 6 is a diagram illustrating pass masks after a pass mask change processing.

The pass separation processing performed in the present exemplary embodiment is described below in detail. FIG. 6 illustrates examples of pass masks stored in the pass mask storage unit 208. The stored pass masks are updated by the above described pass mask change unit 211.

The pass separation processing unit 206 controls recording element recording each dot and recording order thereof by applying a mask pattern M(i, j) to halftone image data B(x, y). Here, (x, y) is coordinates representing a pixel position of an image and the halftone image data B(x, y) represents a pixel value at the pixel position (x, y). More specifically, in a binary ink-jet printer, if B(x, y)=1, a dot is recorded by ink discharge, whereas, if B(x, y)=0, ink is not discharged and no dot is recorded.

In the present exemplary embodiment, scanning is performed four times (i.e., four passes) in the multipass recording method. The recording head 201 includes nozzle arrays corresponding to the respective colors. The nozzle array corresponding to one color material includes 16 nozzles and the nozzles are divided into groups 1 through 4. Each group includes 4 nozzles. Nozzles 12 through 15 constitute a first group, nozzles 8 through 11 constitute a second group, nozzles 4 through 7 constitute a third group, and nozzles 0 to 3 constitute a fourth group. The recording medium is conveyed by a distance corresponding to each 4 nozzles to perform recording in the order of group numbers. Therefore, 4 scans are performed on the same region to form an image.

In each pass mask, a print permitted pixel is painted in black and given 1 and a print prohibited pixel is painted in while and given 0.

In this case, the recording data S(x, y) can be obtained by the following equation.

$$S(x, y) = B(x, y) \ \& \ M(x\%w, y\%h)$$

where w and h represent, respectively, a width and a height of the pass mask, % represents a modulo (reminder) arithmetic, and & represents AND operation. For example, in the binary halftone image data, if B(x, y)=1 and M(x%w, y%h)=1, the nozzle records a dot at a position corresponding to a pixel position (x, y). The first through the fourth groups of S(x, y) become recording data in each scan.

Figure 5:
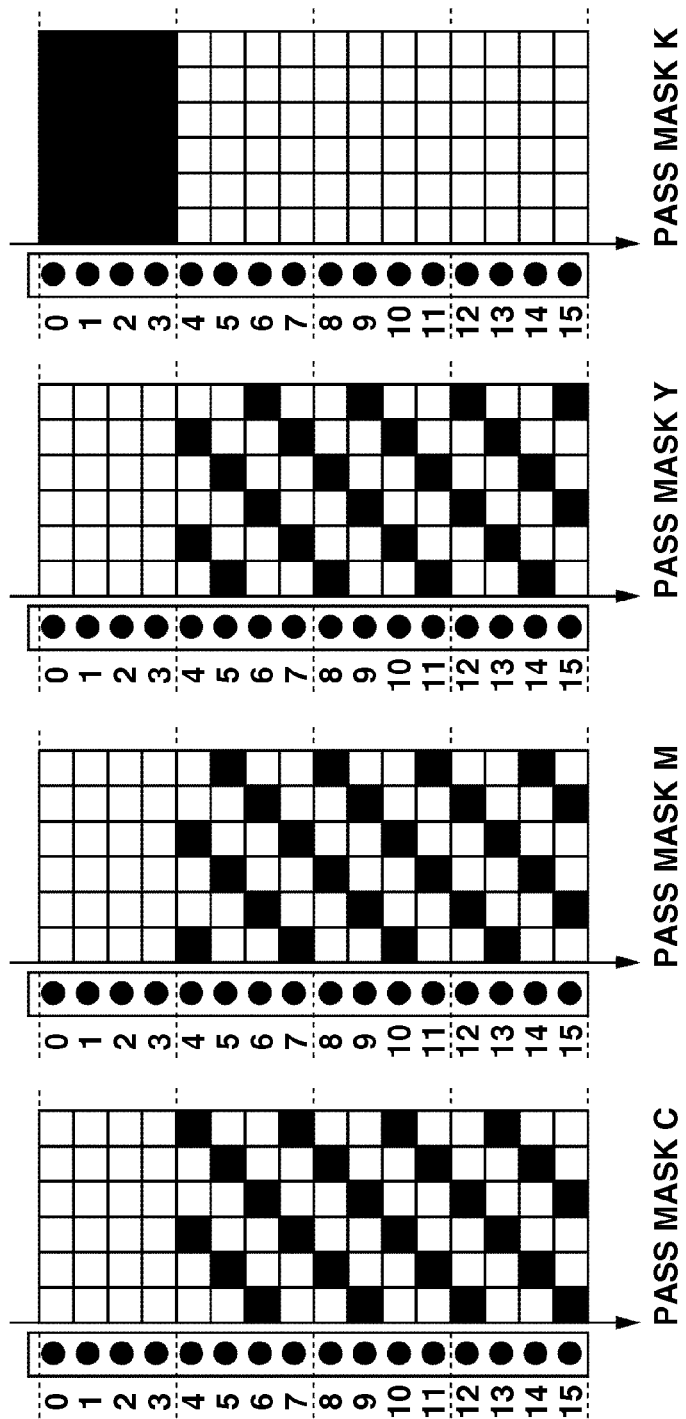
FIG. 5 is a diagram illustrating examples of initial pass masks.

The pass mask change processing performed in the present exemplary embodiment is described below in detail. FIG. 5 illustrates examples of initial pass masks according to the present exemplary embodiment. The pass mask change unit 211 obtains the initial pass masks from the initial pass mask table 212. In the initial pass masks, black ink is recorded after the other color materials are recorded. In other words, in a case where the black (K) ink overlaps on the other color materials, it is so designed that the K ink becomes the uppermost layer. Until a defective nozzle is detected, the initial pass masks are stored in the pass mask storage unit 208.

The pass mask change unit 211 obtains the defective nozzle information stored in the defective nozzle information storage unit 210. It is supposed that the defective nozzle information indicating that the first nozzle of K is in the defective discharge state is obtained here.

The pass mask change unit 211 changes the initial pass masks based on the obtained defective nozzle information and the non-discharge complement setting table 213. FIG. 7 illustrates an example of the non-discharge complement setting table in the present exemplary embodiment. Each line includes position information of the defective nozzles and each column corresponds to nozzles of the respective colors. FIG. 6 illustrates a result of change of the initial pass masks of FIG. 5 according to an ink non-discharge complement setting table.

Since the first nozzle of K corresponds to the fourth pass of K, a line of "K_4 pass" of the ink non-discharge complement setting table is to be referred to. In the line of K, "K4→K3" is stored. This means that "in the fourth pass of K, the defective nozzle print permitting pixel scheduled to be recorded by the first nozzle is shifted to the third pass of K". According to the information, the print permitting pixel of the first nozzle of K is shifted to the fifth nozzle of K corresponding to the first nozzle of the third pass. Similarly, with respect to the columns of C, M, and Y, a print permitting pixel of the fifth nozzle is shifted to the ninth nozzle, respectively, according to the stored information of "C3→C2", "m3→M2", and "Y3→Y2". Here, "-" means no change. As a result, as illustrated in FIG. 6, similar to the cases of the initial pass masks, it is seen that, in a case where the K ink overlaps the other color materials, the K ink lies always on the uppermost layer. Accordingly, the recording data to be recorded by the defective nozzle is complemented by the other nozzle. As a result, the overlap of the color materials (i.e., order of the impacts) is prevented from being differentiated between a scan line to be recorded by the defective nozzle and the other scan lines.

In addition to the above, a case where a destination nozzle to which the print permitting pixel is assigned is also the defective discharge nozzle is described below. It is supposed that the first nozzle of K and the fifth nozzle of K are in the defective discharge state here. Since the first nozzle of K corresponds to the fourth pass of K, a line of "K_4 pass" of the ink non-discharge complement setting table is referred to. As similar to the above described example, the print permitting pixel shifting of "K4→K3", "C3→C2", "M3→M2", and "Y3→Y2" is performed with respect to each color. Further, since the fifth nozzle of K corresponds to the third pass of K, a line of "K_3 pass" of the ink non-discharge complement setting table is referred to and the print permitting pixel shifting of "K3→K2", "C2→C1", "M2→M1", and "Y2→Y1" is performed for each color. Namely, the print permitting pixel shifting is performed in 2 steps in this case. Thus changed pass mask is stored in the pass mask storage unit 208.

As described above, according to the present exemplary embodiment, the defective nozzle is complemented by using the nozzle which records a line identical to the line to be recorded by the defective nozzle with a scan different from that of the defective nozzle when multi-pass printing is performed. At that time, the pass mask can be changed so that the impact order of the color materials can be kept as it is. Therefore, in comparison with a case where the impact order differs depending on the scanning line, the color development unevenness and the gloss unevenness can be suppressed.

In the present exemplary embodiment, a configuration relating to processing for performing the pass separation using the pass masks is installed in the image forming apparatus. However, such a configuration may be installed on the image processing apparatus side. In this case, the image forming apparatus receives recording data corresponding to each scan.

A second exemplary embodiment is described below. In the above described first exemplary embodiment, an example in which the defective nozzle is complemented by changing the pass masks is described. However, in the method for generating the recording data corresponding to each scan by using the pass masks, dots thinned from a fixed pattern are recorded in every main scan. Therefore, dispersibility of a dot pattern to be recorded in each main scan and dispersibility of a dot pattern accumulated in the way of forming the main scan are degraded.

In the second exemplary embodiment, a method for performing processing based on the dither method for each main scan after distributing the multi-valued image data to each scan is described. In the second exemplary embodiment, complement of the defective nozzle in consideration of the impact order of the color materials is realized by controlling a division rate when the color separated data is distributed to each scan. Descriptions of configurations common to those of the first exemplary embodiment are simplified or omitted here.

Figure 8:
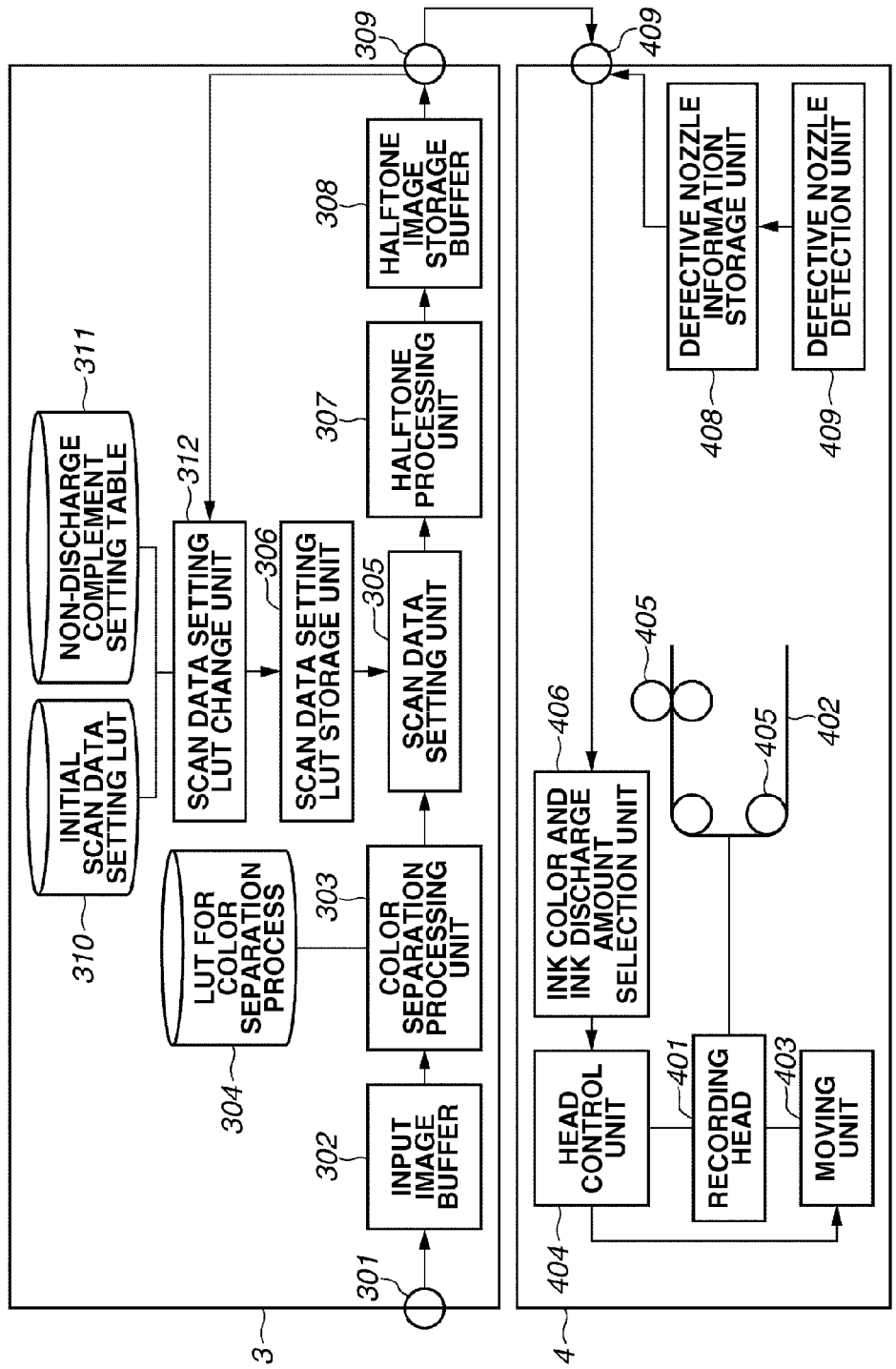
FIG. 8 is a block diagram illustrating a configuration of the image processing apparatus and the image forming apparatus.

FIG. 8 is a block diagram illustrating configurations of an image processing apparatus and an image forming apparatus applicable to the second exemplary embodiment.

A scan data setting unit 305 distributes color separated data for each color material obtained from a color separation processing unit 303 for each scan based on the LUT received from a scan data setting LUT storage unit 306. Scan data in the present exemplary embodiment indicates a recording ink amount in each scan as multi-valued data.

A scan data setting LUT change unit 312 changes the scan data setting LUT based on defective nozzle information stored in a defective nozzle information storage unit 408, an initial scan data setting LUT 310, a non-discharge complement setting table 311. The changed LUT is stored in the scan data setting LUT storage unit 306.

The halftone processing unit 307 converts a multiple value of each color per scan obtained by the scan data setting unit 305 into binary halftone image data and outputs the recording data recorded by each scan. A halftone image storage buffer 308 stores recording data of each color per scan obtained by the halftone processing unit 307. The halftone processing unit 307 may perform halftone processing for quantizing the data into multivalued image data with more than two values.

The recording data stored in the halftone image storage buffer 308 is output to an image forming apparatus 4 via an output terminal 309. Different from the first exemplary embodiment, recording data of each scan is input into the image forming apparatus 4.

Figure 9:
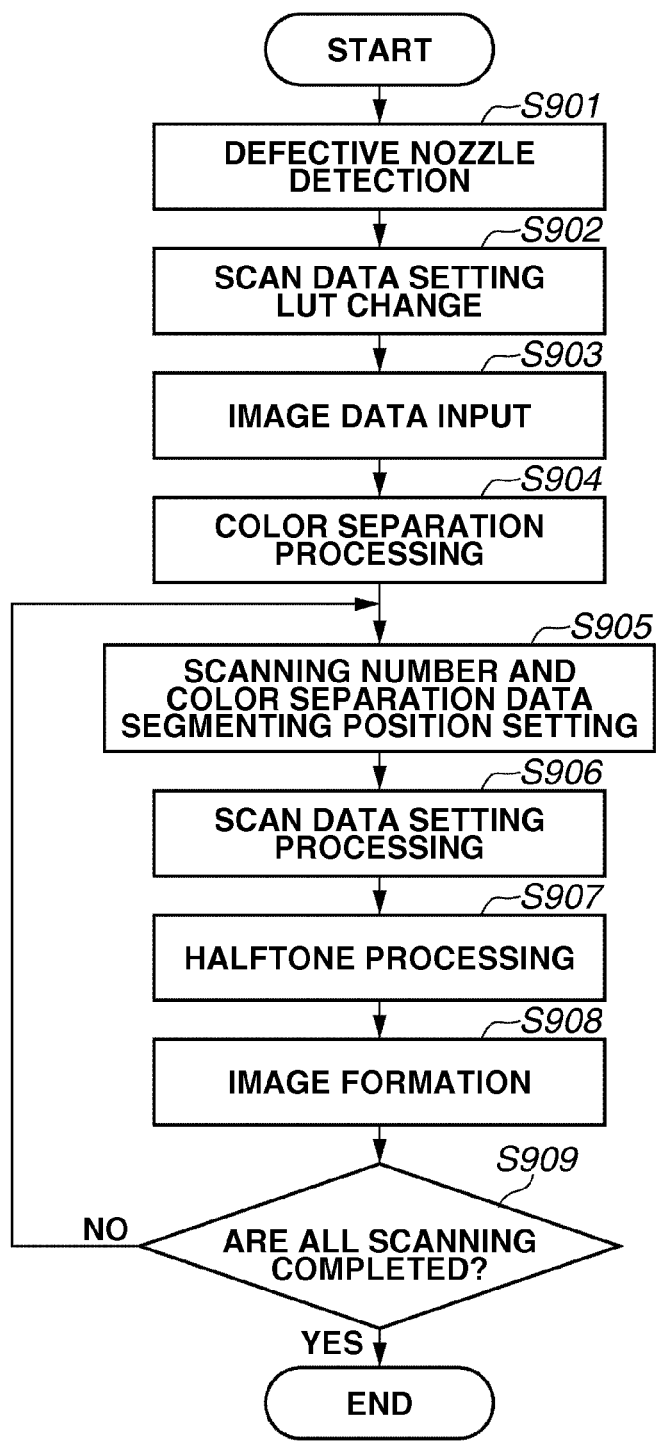
FIG. 9 is a flow chart illustrating a flow of an image processing method.

An image processing method according to the present exemplary embodiment having the above described functional configuration is described below. FIG. 9 is a flow chart illustrating a flow of image processing applicable to the second exemplified embodiment.

In step S901, a defective nozzle detection unit 407 detects a nozzle in the defective discharge state among a plurality of nozzles constituting a recording head 401. Defective nozzle information obtained in the detection is stored in a defective nozzle information storage unit 408.

In step S902, the scan data setting LUT change unit 312 changes a scan data setting LUT based on the defective nozzle information stored in the defective nozzle information storage unit 408, the initial scan data setting LUT 310, and the non-discharge complement setting table 311. The scan data setting LUT change processing is described below in detail.

In step S903, the color input image data is input via the input terminal 301 and stored in the input image buffer 302.

In step S904, the color separation processing unit 303 performs color separation processing on the color input image data stored in the input image buffer 302 from RGB to CMYK by using LUT for color separation process 304.

In step S905, the scan data setting unit 305 sets a scan number k and a cut(k) representing Y coordinate as a color separation data segmenting position. The cut (k) represents a color separation data segmenting position in the scan number k, i.e., is corresponding to a nozzle upper end coordinates. An initial value of the scan number k is 1 and is incremented by 1 for each processing loop.

A generalized post-color separation data segmenting position cut (k) can be obtained by the following equation where the number of nozzle columns is represented by "Nzzl", the number of passes by "Pass", and the number of scan by "k".

$$\text{cut}(k) = Nzzl + (Nzzl/\text{Pass}) \times k$$

Figure 10:
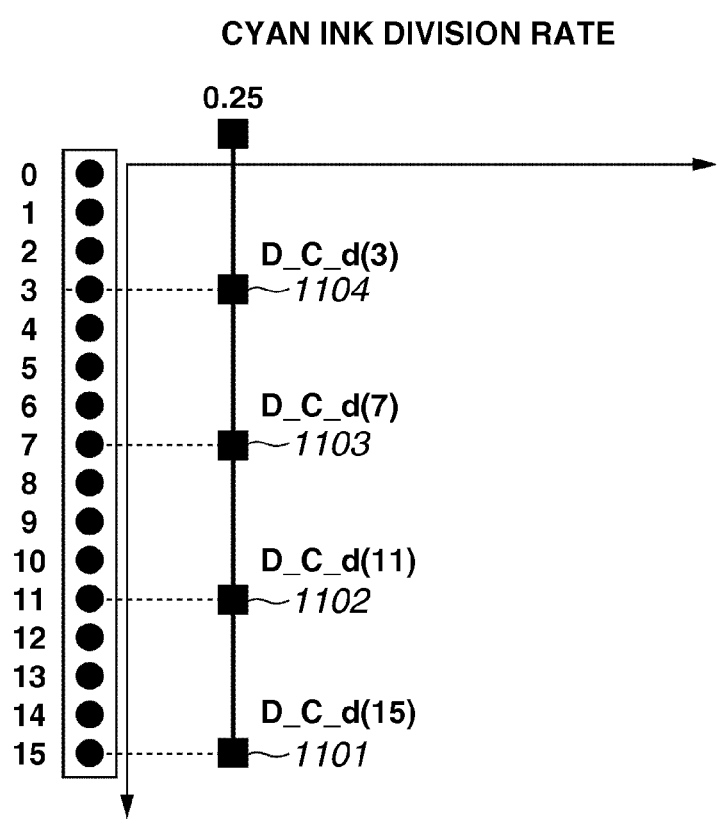
FIG. 10 is a diagram illustrating an ink division rate.

In step S906, the scan data setting unit 305 converts the color separated data of each color into scan data per scan based on the scan data setting LUT and the scan data correction LUT. A case of 4-pass (i.e., 4 scans) is exemplified here to consider a case for uniformly setting scan data per nozzle. FIG. 10 illustrates a division rate. The division rate indicates a ratio with respect to the color separated data to be assigned to each nozzle (i.e., each pass). In FIG. 10, points of D_C_d (3), D_C_d(7), D_C_d(11), and D_C_d(15) (i.e., respectively, point 1101 through point 1104) are set for each 4 nozzles and the points are subjected to a linear complement to obtain the division rate for 16 nozzles. A longitudinal axis represents a nozzle position and a horizontal axis represents a division rate. At that time, the division rate is designed so that the sum of the values of D_C_d(3), D_C_d(7), D_C_d(11), and D_C_d(15) becomes 1. Similarly, the division rates of the other 3 colors (i.e., MYK) are also given an ink value division rate of 0.25 to the same as the ink value division rate of D_C_d. The division rates of the other 3 colors are represented by D_M_d, D_Y_d, and D_K_d. In the present exemplary embodiment, for the sake of simple description, two colors of C (cyan) and Y (yellow) in the above described colors are exemplified.

The scan data setting LUT change processing is described below in detail. In the present exemplary embodiment, it is supposed that a defective discharge state of a fifth nozzle of Y is detected by the defective nozzle detection unit 407.

The scan data setting LUT change unit 312 receives defective nozzle information and refers to the non-discharge complement setting table. FIG. 14 illustrates the non-discharge complement setting table. Each line includes positional information of the defective nozzles and each column corresponds to the nozzles of each color.

Figure 11:
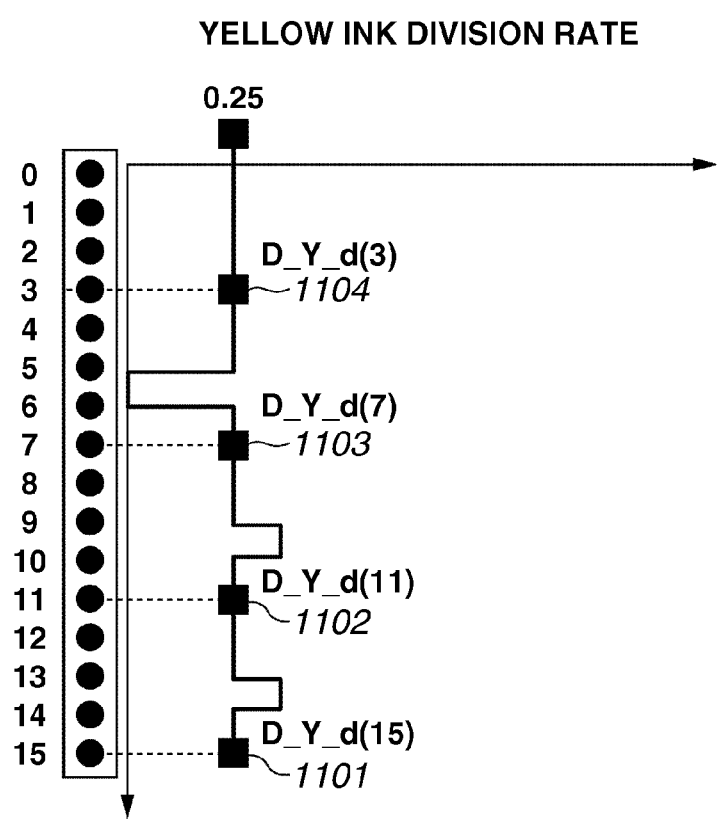
FIG. 11 is a diagram illustrating an ink division rate after being changed.

A reference is made with respect to a line of "Y_3 pass" of the ink non-discharge complement setting table so as to allow the fifth nozzle of Y to record the third pass of Y. "Y3→Y1 (0.5), Y2(0.5)" stored in the table means that "the division rate corresponding to the fifth nozzle of Y is assigned to each of a nozzle corresponding to the fifth nozzle in the first pass of Y and a nozzle corresponding to the fifth nozzle in the second pass of Y by 0.5 times of the division rate corresponding to the fifth nozzle of Y". FIG. 11 illustrates a division rate of yellow updated by the above described processing. In this way, the scan data setting LUT change processing is ended.

Figure 12:
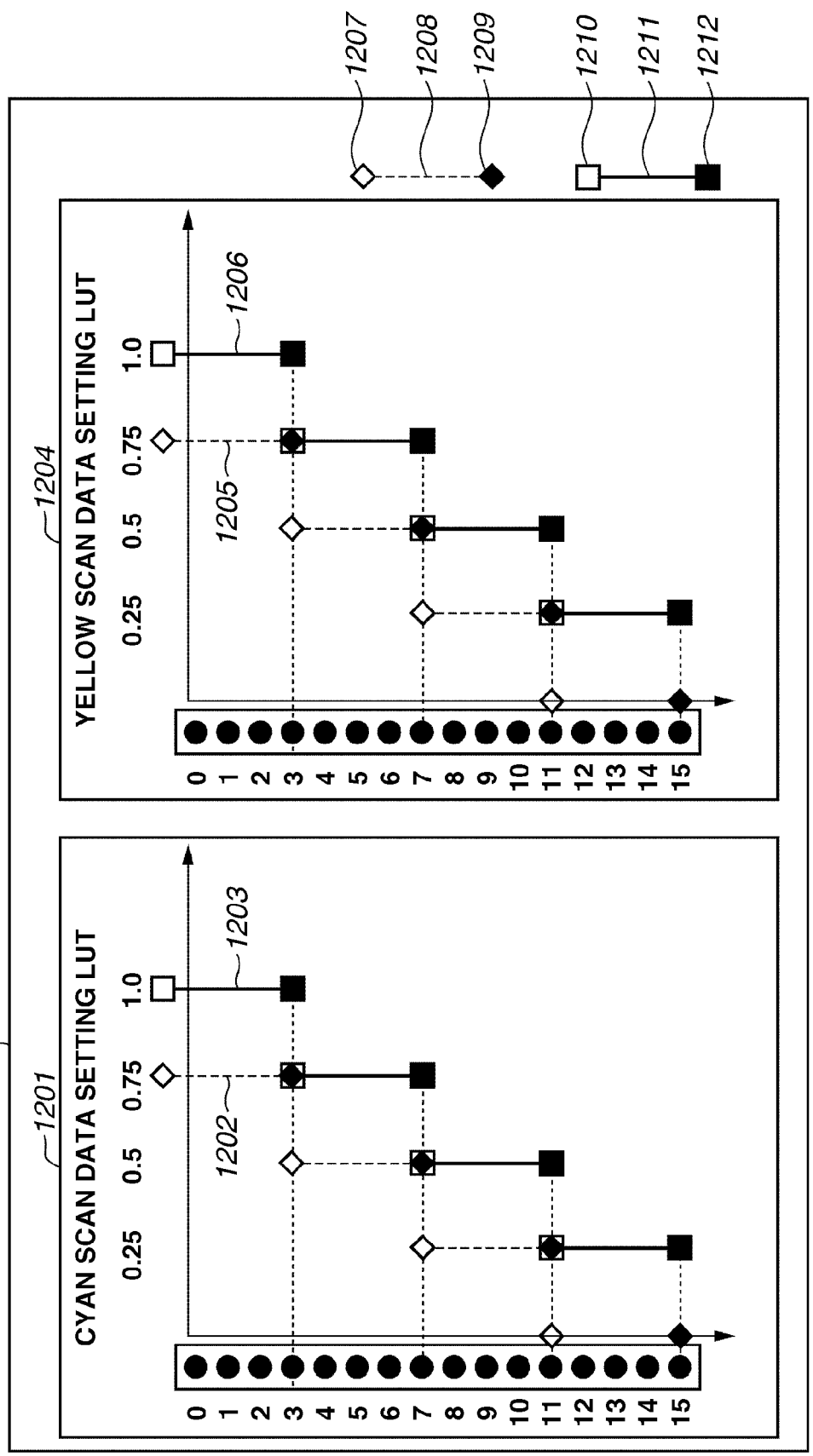
FIG. 12 is a scan data setting look up table (LUT).

FIG. 12 illustrates a cyan scan data setting LUT and a yellow scan data setting LUT. A scan data setting LUT is set based on a relationship between a nozzle position and a scan data setting value. In the cyan scan data setting LUT 1201 and the yellow scan data setting LUT 1204, a longitudinal axis indicates values of a nozzle position and a horizontal axis indicates values of a scan data setting LUT. The scan data setting LUT includes two kinds of settings such as a lower-order LUT 1202 and a higher-order LUT 1203. Data of a lower-order LUT is represented by a dotted-line 1208, a point 1207, and a point 1209, and a higher-order LUT is represented by a solid line 1211, a point 1210, and a point 1212.

Where a lower-order LUT of the cyan scan data setting LUT 1201 is represented by U_C_LUT(ny) and a higher-order LUT is represented by O_C_LUT(ny), the lower-order LUT and the higher-order LUT are generated according to the below described rule.

$$U\_C\_LUT(ny)=D\_C\_d(ny+Nzzl/4)+D\_C\_d(ny+2\times Nzzl/4)+D\_C\_d(ny+3\times Nzzl/4)$$
$$O\_C\_LUT(ny)=D\_C\_d(ny)+D\_C\_d(ny+Nzzl/4)+D\_C\_d(ny+2\times Nzzl/4)+D\_C\_d(ny+3\times Nzzl/4),$$

where $0 \le nx <$ size of image $X$ and $0 \le ny < Nzzl$

More specifically, the lower-order LUT is an "accumulated value at the corresponding nozzle position before a prior pass" and the higher-order LUT is an "accumulated value at the corresponding nozzle position before the current pass".

Values are given in a similar manner as described above with respect to U_Y_LUT(ny) as a lower-order LUT of yellow and O_Y_LUT(ny) as a higher-order LUT of yellow.

The scan data setting unit 305 creates a scan data evaluation correction LUT based on the scan data correction LUT.

Figure 13:
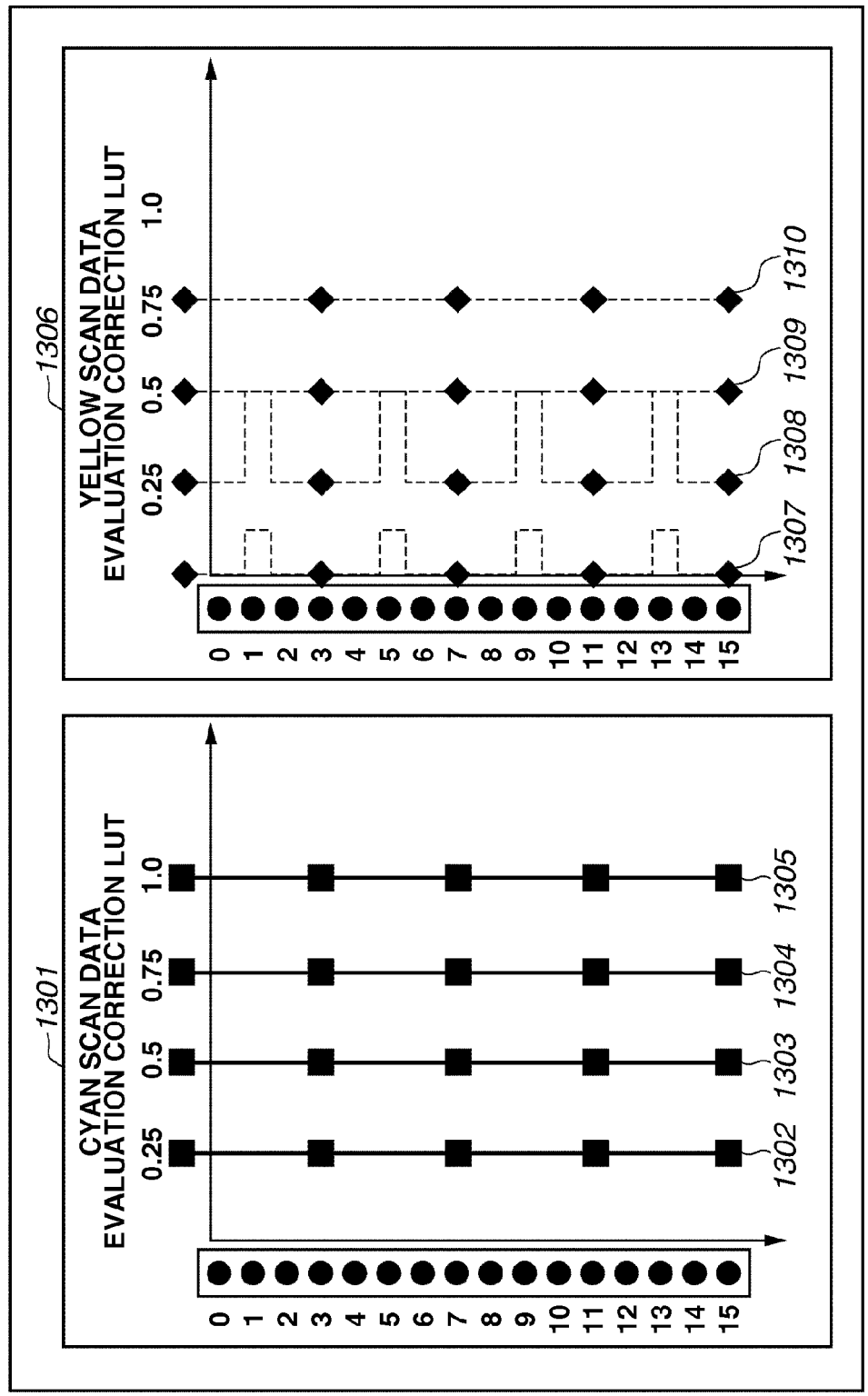
FIG. 13 is a scan data evaluation correction LUT.

As illustrated in FIG. 13, the scan data evaluation correction LUT is set based on a relationship between the nozzle position and the scan data setting value. A cyan scan data evaluation correction LUT 1301 is used for evaluating the scan data of cyan (i.e., a color material disposed on an upper layer). A yellow scan data evaluation correction LUT 1306 is used for correcting the scan data of a color material (i.e., Y in the present exemplary embodiment) to be set on a lower layer. Solid lines 1302 through 1305 correspond, in this order, to H1_C_1_LUT through H1_C_4_LUT of the cyan scan data evaluation correction LUT.

The cyan scan data evaluation correction LUT is generated according to the rule described below.

(where $0 \le ny < 4$)

$$H1\_C\_1\_LUT(ny)=D\_C\_d(ny+3\times Nzzl/4)$$

$$H1\_C\_2\_LUT(ny)=D\_C\_d(ny+3\times Nzzl/4)+D\_C\_d(ny+2\times Nzzl/4)$$

$$H1\_C\_3\_LUT(ny)=D\_C\_d(ny+3\times Nzzl/4)+D\_C\_d(ny+2\times Nzzl/4)+D\_C\_d(ny+Nzzl/4)$$

$$H1\_C\_4\_LUT(ny)=D\_C\_d(ny+3\times Nzzl/4)+D\_C\_d(ny+2\times Nzzl/4)+D\_C\_d(ny+Nzzl/4)+D\_C\_d(ny).$$

In a case of a nozzle after the fourth nozzle, a value set to $0 \le ny < 4$ nozzle is repetitively used. In other words, H1_C_1_LUT is obtained by four times repetition of the "accumulated value of the division rate up to the first pass" and H1_C_4_LUT is obtained by four times repetition of the "accumulated value of the division rate up to the fourth pass".

Further, with respect to Y:

(where $0 \le ny < 4$)

$$H1\_Y\_1\_LUT(ny)=0.0$$

$$H1\_Y\_2\_LUT(ny)=D\_Y\_d(ny+3\times Nzzl/4)$$

$$H1\_Y\_3\_LUT(ny)=D\_Y\_d(ny+3\times Nzzl/4)+D\_Y\_d(ny+2\times Nzzl/4)$$

$$H1\_Y\_4\_LUT(ny)=D\_Y\_d(ny+3\times Nzzl/4)+D\_Y\_d(ny+2\times Nzzl/4)+D\_Y\_d(ny+1\times Nzzl/4).$$

In a case of a nozzle after the fourth nozzle, a value set to $0 \le ny < 4$ nozzle is repetitively used.

Figure 15:
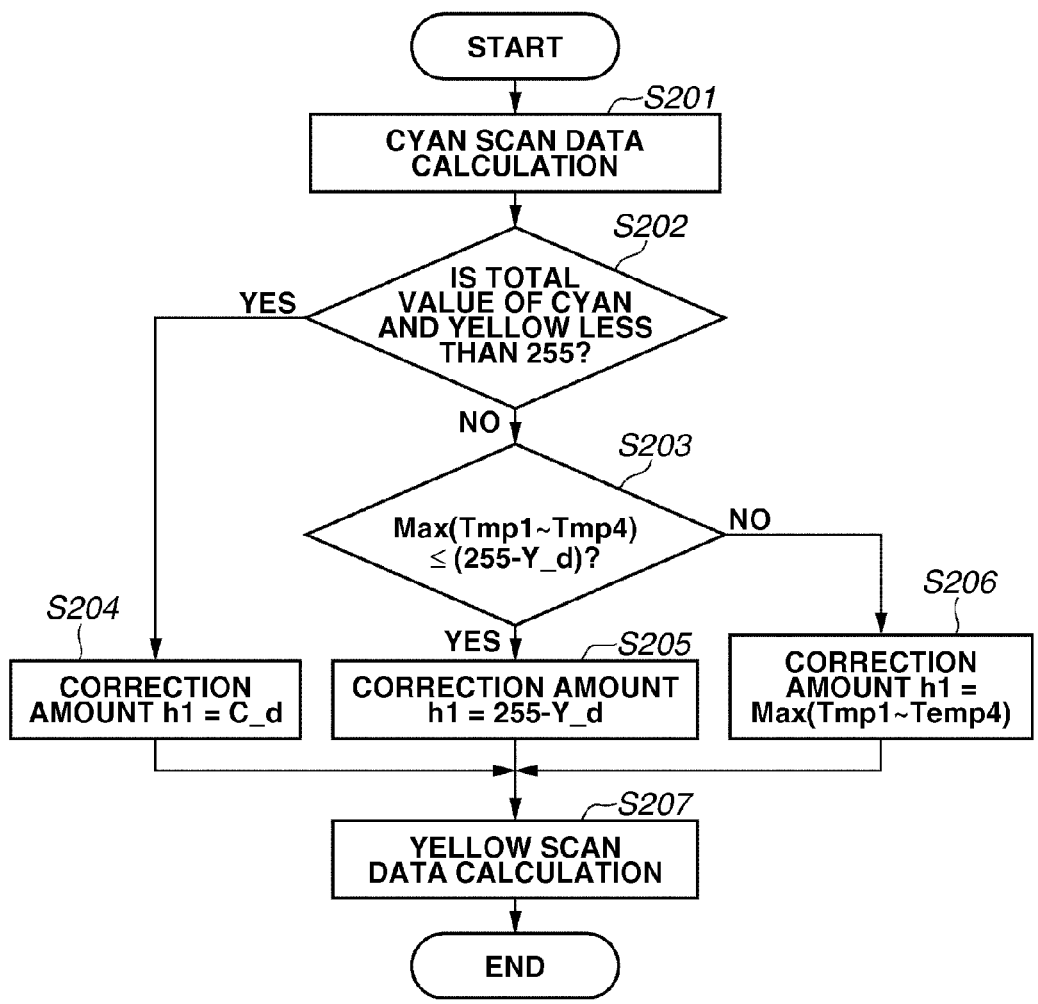
FIG. 15 is a flow chart illustrating a flow of scan data setting processing.

The scan data setting processing performed in the present exemplary embodiment is described below with reference to a flow chart of FIG. 15. In step S201, the cyan scan data is calculated according to the following equation.

$$U\_C\_d(nx, ny)=C\_d(nx, ny+cut(k))\times U\_C\_LUT(ny)$$

$$O\_C\_f(nx, ny)=C\_d(nx, ny+cut(k))\times O\_C\_LUT(ny)$$

In step S202, whether a "condition 1" is satisfied is determined. More specifically, a determination is made whether a total value of the values of cyan and yellow is less than 255. In a case where the total value is less than 255 (YES in step S202), the processing proceeds to step S204. On the other hand, in a case where the total value is equal to or larger than 255 (NO in step S202), the processing proceeds to step S203.

In step S203, a "condition 2" is determined. More specifically, a determination is made whether a total coverage of the values of cyan and yellow is a value equal to or more than 100% (i.e., C_d+Y_d≥255) and whether Max (Tmp1 through Tmp4)≥(255−Y_d) is satisfied. A determination equation at this time of determining the condition 2 is as indicated below. "Condition 2" In a case where the total value coverage of the values of cyan and yellow is equal to or more than 100% (i.e., C_d+Y_d≥255) and Max(Tmp1 through Tmp4)≤ (255−Y_d), and in a case where C_d+Y_d≥255 and
Tmp1=C_d(nx, ny+cut(k))×H1_C_LUT_1(ny)−Y_d(nx, ny+cut(k))×H1_Y_LUT_1(ny)
Tmp2=C_d(nx, ny+cut(k))×H1_C_LUT_2(ny)−Y_d(nx, ny+cut(k))×H1_Y_LUT_2(ny)
Tmp3=C_d(nx, ny+cut(k))×H1_C_LUT_3(ny)−Y_d(nx, ny+cut(k))×H1_Y_LUT_3(ny), and
Tmp4=C_d(nx, ny+cut(k))×H1_C_LUT_4(ny)−Y_d(nx, ny+cut(k))×H1_Y_LUT_4(ny), Max(Tmp1 through Tmp4)≤255−Y_d(nx, ny+cut(k)) (where the Max(Tmp1 through Tmp4) is a function returning the maximum value of Tmp1 through Tmp4). Meantime, in a case where none of the "condition 1" and "condition 2" is satisfied, the condition is determined as a "condition 3".

In a case where the "condition 2" is satisfied (YES in step S203), the processing proceeds to step S205. On the other hand, in a case where the "condition 3" is satisfied (NO in step S203), processing proceeds to step S206.

In step S204, a correction amount with respect to the yellow scan data when the "condition 1" is satisfied is calculated. At that time, a cyan scan data itself is given as a yellow correction value.

In step S205, a correction amount with respect to the yellow scan data when the "condition 2" is satisfied is calculated. At that time, the yellow correction value h1 is given by (255−Y_d).

In step S206, a correction amount with respect to the yellow scan data when the "condition 3" is satisfied is calculated. The yellow correction value h1 is given by Max (Tmp1 through Tmp4).

In step S207, the yellow lower-order scan data U_Y_d and the higher-order scan data O_Y_d are calculated by using the correction value h1.

$$U\_Y\_d(nx, ny)=Y\_d(nx, ny+cut(k)) \times U\_Y\_LUT(ny)+h1$$

$$O\_Y\_d(nx, ny)=Y\_d(nx, ny+cut(k)) \times O\_Y\_LUT(ny)+h1$$

In this way, the scan data setting is ended.

Figure 16:
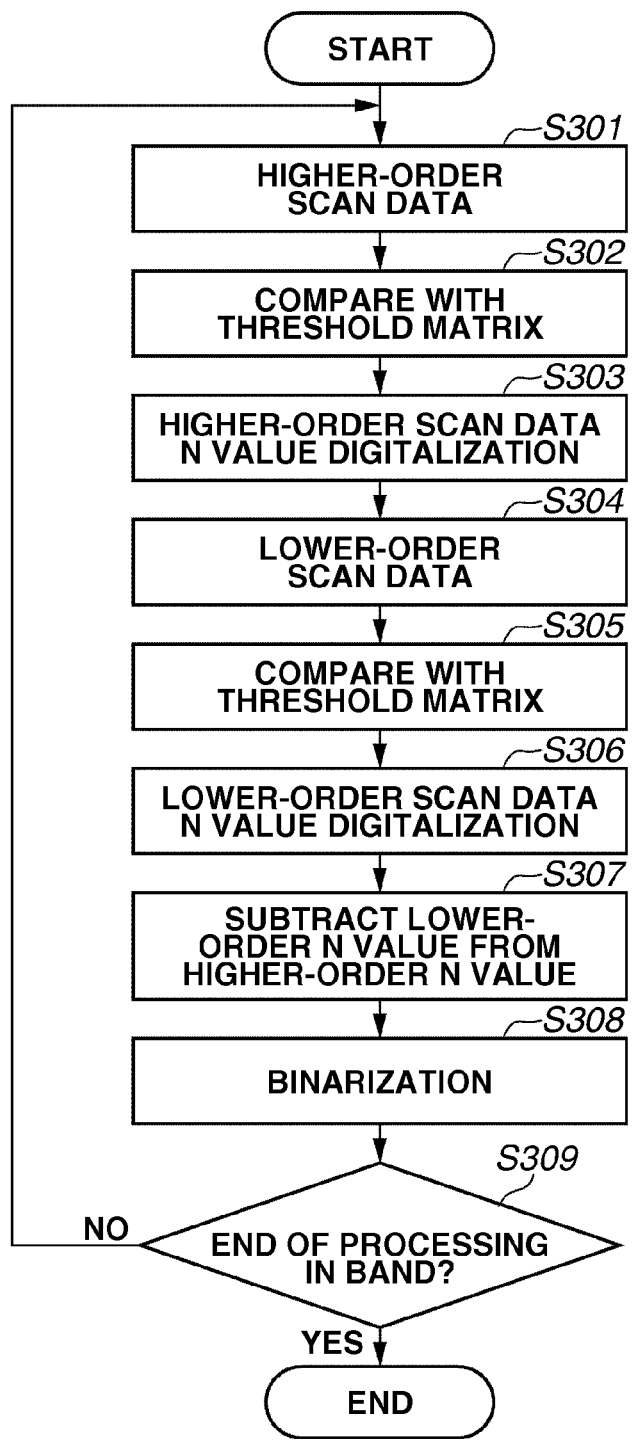
FIG. 16 is a flow chart illustrating a flow of halftone processing.

As described above, in step S907, the scan data set in the scan data setting unit 305 is converted into binary halftone image data in the halftone processing unit 308. The halftone processing is performed by using the well-known dither method in which input image data is converted into binary data. The halftone processing performed in the present exemplary embodiment is described below with reference to a flow chart of FIG. 16. For the sake of simple description, the halftone processing performed with respect to cyan and yellow where the scan number k=1 among the four pass recording is exemplified for the description.

In step S301, the cyan higher-order scan data O_C_d and the yellow higher-order scan data O_Y_d are input.

In step S302, the halftone processing unit makes comparisons between the cyan higher-order scan data O_C_d and a dither matrix and between the yellow higher-order scan data O_Y_d and the dither matrix. FIG. 17 illustrates a dither matrix. A threshold Th_1 in the dither matrix 2001 is a value within a range between 1 and 255. The dither matrix 2001 is a threshold group corresponding to an address on a printed image. A rule for binarization at this time is as follows.

$$Out\_O\_C=0, Th\_1 \le O\_C\_d, \text{ and } Out\_O\_C=1 \text{ when } O\_C\_d<Th\_1.$$

In step S303, the cyan higher-order halftone image data Out_O_C and the yellow higher-order halftone image data Out_O_Y are output.

In step S304, the lower-order scan data is input. In step S305, comparisons are made between the cyan lower-order scan data U_C_d and the dither matrix 2001 and between the yellow lower-order scan data U_Y_d and the dither matrix 2001, respectively. In step S306, the cyan lower-order halftone image data Out_U_C and the yellow lower-order halftone image data Out_U_Y are output.

In step S307, the cyan lower-order halftone image data is subtracted from the cyan higher-order halftone image data and the yellow lower-order halftone image data is subtracted from the yellow higher-order halftone image data, thereby, in step S308, calculating the cyan halftone image data and the yellow halftone image data.

In step S309, the above described processing of steps S301 through S308 is performed from the address (0, 0) through (W-1, Nzzl-1) within a band, thereby outputting the halftone image data per scan. As a result, the recording data recorded by each scan can be obtained.

As described above, when the halftone processing in step S907 is ended, band data corresponding to data having the number of nozzles (Nzzl) in the longitudinal direction and an image size X (W) in a horizontal direction is output via the output terminal 310. After receiving the recording data, the image forming apparatus 2 selects a color material suitable for the recording data. In step S908, the image is then started to be formed.

In step S909, whether all the scans are completed is determined. In a case where all the scans are completed (YES in step S909), a series of steps of image processing is completed. On the other hand, in a case where all the scans are not completed (NO in step S909), the processing returns to step S905. In this way, all the steps of the processing are ended.

As described above, according to the present exemplary embodiment, when the multi-pass recording is performed, dispersibilities of a dot pattern recorded by each scan and dot pattern accumulated on the way of forming an image are set higher as well as the complementing processing of the defective nozzle can be executed while the ink to be disposed on the lower layer and the ink to be disposed on the upper layer are controlled.

In the present exemplary embodiment, the dither method performing binarization is exemplified in order to describe the halftone processing. However, the halftone processing is not limited to this method. The halftone processing may be performed by using a method performing N-valued calculation, where the N is a value equal to or more than 3. In this case, the dither matrix of the number of (N-1) is required.

In the above described exemplary embodiment, 4 colors of C, M, Y, and K are the color materials to be used here. However, the colors of color materials and the number of colors are not limited thereto. Light shade inks such as light shade cyan, light shade magenta, and gray, and special color inks such as red, green, and blue can also be used here. Translucent ink and metallic ink can also be used here.

For the sake of description, the number of nozzles is set to 16 and the number of scans is set to 4. However, the numbers are not limited thereto, and may be set arbitrary.

Further, the recording head is moved perpendicular to a moving direction of the recording medium. However, a relative movement between the recording head and the recording medium is not limited to any method. An example in which, for example, a full line type long recording head is used may be applicable as far as the example has a configuration corresponding to the multipass recording method using a plurality of nozzles. In this case, the recording head is a fixed type recording head and the multi-pass recording can be realized by conveying the recording medium. Any recording method corresponding to the multipass recording method is applicable with respect to a recording apparatus (e.g., a heat transfer type recording apparatus and an electrophotographic type recording apparatus) for recording according to a recording method other than the inkjet method. In this case, the nozzle for discharging ink droplets corresponds to a recording element for recording dots and a laser light emitting device.

In the above described exemplary embodiments, a case where the nozzle becomes defective due to malfunction is exemplified as the defective nozzle. However, a cause of malfunction is not limited to the case of the defective discharge. For example, a defective discharge nozzle which discharges a volume of ink less than a predetermined volume of ink droplets and a discharge twisting nozzle in which an ink droplet flying direction curves may also be included in the defective nozzle. More specifically, the defective nozzle means an unusable nozzle or an unpreferable nozzle in use. The present invention is directed to a technique in which a position to be recorded by the defective nozzle is recorded by the other nozzle capable of recording the position so as to complement a recording function of the defective nozzle and thus is applicable to any defective nozzle.

In the above described exemplary embodiments, a case where recording order of all the pixels does not change before and after the complement of the defective recording element is exemplified. However, fixed recording order is not always necessary for all the pixels. The present invention is directed to "consideration of a change of the recording order" in complementing the defective nozzle and thus the other various modifications in which the recording order of pixels changes partially can also be implemented. As a matter of course, it is desirable that a rate of pixels of which recording order changes is small. According to the experiments performed by the inventors, it is found that a desirable rate is at least equal to or less than a half of the pixels of which scan-recording pattern is changed. When the recording order changes, the largest visual effect is exerted in a case where the color material to be recorded on the uppermost layer changes. Therefore, such a modification that at least the color material to be recorded on the uppermost layer does not change can also be implemented with ease.

The same effect can be obtained only when focusing on the impact order of a portion of color materials without considering the impact order of all the color materials. For example, such a configuration that the complement processing of the defective nozzle is performed so that the impact order would not be changed only with respect to cyan and magenta may also be employable.

In the above described exemplary embodiments, a method for changing the initial state is described as the method for complementing the defective nozzle in consideration of the impact order of the color materials. However, the method is not limited to the above. For example, in the configuration that the pass separation processing is performed by a pass mask as in the first exemplary embodiment, a plurality of pass mask sets are preliminary held to switch the pass masks according to the defective nozzle information. For example, in a case of performing the 4 pass recording, four pass masks are formed into one set and a plurality number of sets are held, each set corresponding to each scan and forming an image via accumulation thereof. Then, in consideration of the impact order of the color materials, the set may be switched to a set enabling a suitable complement of the defective nozzle. As described above, there are various methods for complementing the defective nozzle. In those methods, the defective nozzle is complemented such that the impact order of the color materials can be kept as it is.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)Tm), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-093114 filed Apr. 16, 2012, which is hereby incorporated by reference herein in its entirety.

What is claimed is:

1. An image processing apparatus for forming an image by performing a plurality of times of recording on a same region of a recording medium by using a recording head including a plurality of recording elements for each of a first color material and a second color material different from the first color material, the image processing apparatus comprising:
an input unit configured to input image data of each of the first color material and the second color material; and
a generation unit configured to generate recording data corresponding to each scan of the first color material and the second color material based on the image data of the first color material and the second color material, the recording data being used for assigning a recording amount represented by a pixel value of a pixel constituting the image data to each of the recording elements for the first color material and the second color material;
wherein the generation unit generates, in a case where the plurality of recording elements for recording the first color material includes at least a defective recording element, recording data corresponding to each scan of the first color material so that a recording amount assigned to the defective recording element is complemented with a recording element corresponding to the first color material different from the defective recording element, and assignment to a recording element of each pixel constituting the image data corresponding to the second color material is changed so that impact order between the first color material and the second color material is not changed, and the generation unit generates recording data corresponding to each scan of the second color material according to a recording position of the recording element to complement the defective recording element.

2. The image processing apparatus according to claim 1, wherein the generation unit includes a defective recording element complement setting table indicating another recording element to be used for complementing the defective recording element when a recording element becomes a defective recording element and generates the recording data based on the defective recording element complement setting table.

3. The image processing apparatus according to claim 1, wherein the generation unit generates the recording data by using a pass mask representing recording pixels and unrecording pixels corresponding to each scan after performing halftone processing on the input image data.

4. The image processing apparatus according to claim 1, wherein the generation unit generates the recording data by distributing a pixel value of each pixel constituting the input image data to each scan and performing halftone processing on each pieces of image data obtained by the distribution.

5. A non-transitory computer-readable recording medium for storing a computer executable program that causes a computer to function as the image processing apparatus according to claim 1 when read and executed by the computer.

6. The image processing apparatus according to claim 1, wherein the generating unit does not change assignment to a recording element of each pixel constituting image data corresponding to the second color material in a case where the impact order of the first color material and the second color material does not change as a result of the complementing.

7. An image forming apparatus for forming an image using the recording data by an ink-jet method, the image forming apparatus comprising:
the image processing apparatus according to claim 1 disposed therein; and
the recording head.

8. The image processing apparatus according to claim 1, wherein the defective recording element of the first color material and the recording element for complementing the defective recording element are capable of recording in a same scanning line.

9. The image processing apparatus according to claim 1, wherein the defective recording element of the first color material and the recording element for complementing the defective recording element are capable of recording in a same scanning line in different scanning operations.

10. An image processing apparatus for forming an image by performing a plurality of times of recording on a same region of a recording medium by using a recording head including a plurality of recording elements for each of the plurality of color materials, the image processing apparatus comprising:
an acquisition unit configured to acquire defective recording element information indicating a defective recording element among the plurality of recording elements;
a generation unit configured to generate recording data for each scan from input image data for each of the color materials based on assignment of a recording amount represented by a pixel value of a pixel constituting the input image data to be the recording elements for each of the color materials; and
a control unit configured to cause the generation unit to generate recording data obtained in such a manner that a recording amount assigned to the defective recording element is complemented by using another recording element based on the defective recording element information;
wherein the control unit changes assignment corresponding to at least one of color materials different from a color material corresponding to the defective recording element and causes the generation unit to generate recording data so that impact order of the plurality of color materials would not change according to a recording position of the recording element for complementing the defective recording element information.

11. The image processing apparatus according to claim 10, wherein the control unit controls the generation unit so that a color material to be recorded on an uppermost layer is not changed between before and after the defective recording element is complemented.

12. The image processing apparatus according to claim 10, wherein the acquisition unit detects malfunction among the plurality of recording elements.

13. An image processing method for forming an image by performing a plurality of times of recording on a same region of a recording medium by using a recording head including a plurality of recording elements for each of a first color material and a second color material different from the first color material, the method comprising:
inputting image data of the first color material and the second color material; and
generating recording data corresponding to each scan of each of the first color material and the second color material based on image data of the first color material and the second color material and using the recording data for assigning a recording amount represented by a pixel value of a pixel constituting the image data to each of the recording elements for the first color material and the second color material;
wherein, in a case where the plurality of recording elements for recording the first color material includes at least a defective recording element, a recording amount assigned to the defective recording element is complemented by a recording element corresponding to the first color material different from the defective recording element to generate the recording data corresponding to each scan of the first color material; and
wherein assignment to a recording element of each pixel constituting the image data corresponding to the second color material is changed so that impact order between the first color material and the second color material is not changed, and the generating recording data corresponding to each scan of the second color material according to a recording position of the recording element to complement the defective recording element.

14. An image processing method for forming an image by performing a plurality of times of recording on a same region of a recording medium by using a recording head including a plurality of recording elements for each of the plurality of color materials, the method comprising:
acquiring defective recording element information indicating a defective recording element among the plurality of recording elements;
generating recording data for each scan from input image data for each color material based on assignment of a recording amount represented by a pixel value of a pixel constituting the input image data to the recording elements for each of the color materials; and
performing control to generate recording data obtained in such a manner that a recoding amount assigned to the defective recording element is complemented by using another recording element based on the defective recording element information, and to generate recording data so that impact order of the plurality of color materials does not change according to a recording position of the recording element for complementing the defective recording element information.

\* \* \* \* \*